W. A. BARLOW.

2 Sheets—Sheet 1.

Heating Stove.

No. 2,436.

Reissued Jan. 1, 1867.

Witnesses:

Harvey Church

Henry S. Church

Inventor:

Wm. A. Barlow

N. PETERS, Photo-Lithographer, Washington, D. C.

2 Sheets—Sheet 2.

W. A. BARLOW.

Heating Stove.

No. 2,436. Reissued Jan. 1, 1867.

*Witnesses:*

Harry Church

Henry S. Church

*Inventor:*

Wm. A. Barlow

N. PETERS, Photo-Lithographer, Washington, D. C.

UNITED STATES PATENT OFFICE.

WILLIAM A. BARLOW, OF ELKHORN, WISCONSIN.

HEATING-STOVE.

Specification forming part of Letters Patent No. 35,494, dated June 3, 1862; Reissue No. 2,436, dated January 1, 1867.

DIVISION NO. 2.

*To all whom it may concern:*

Be it known that I, WILLIAM A. BARLOW, of Elkhorn, in the county of Walworth and State of Wisconsin, have invented a new and useful Improvement in Stoves, (for which Letters Patent of the United States were granted me on the 3d day of June, 1862;) and I do hereby declare that the following is a full and exact description thereof, reference being had to the accompanying drawings, making part of this specification, and the letters marked thereon, similar letters indicating corresponding parts in all the drawings.

Figure 1:
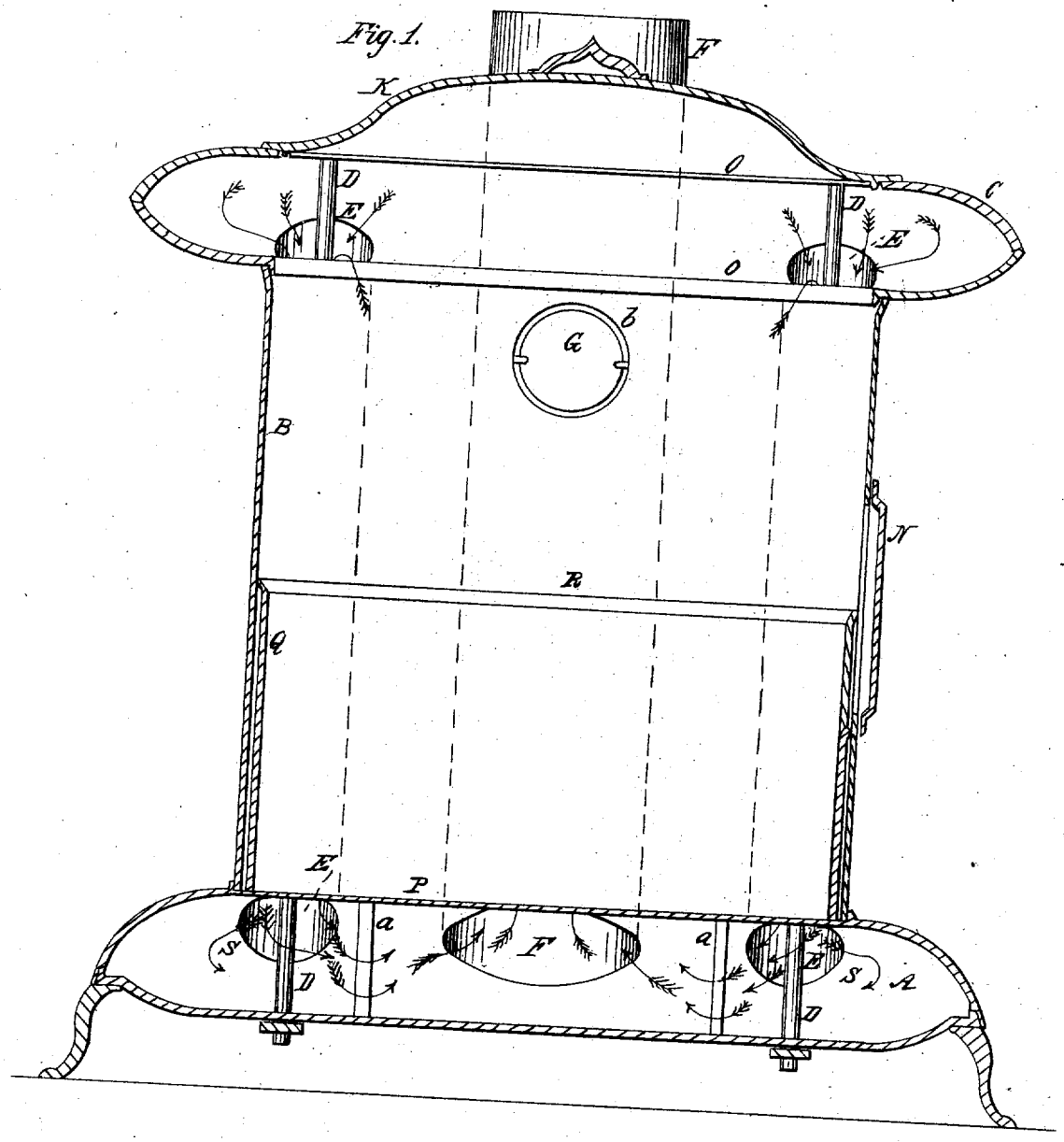
Figure 2:
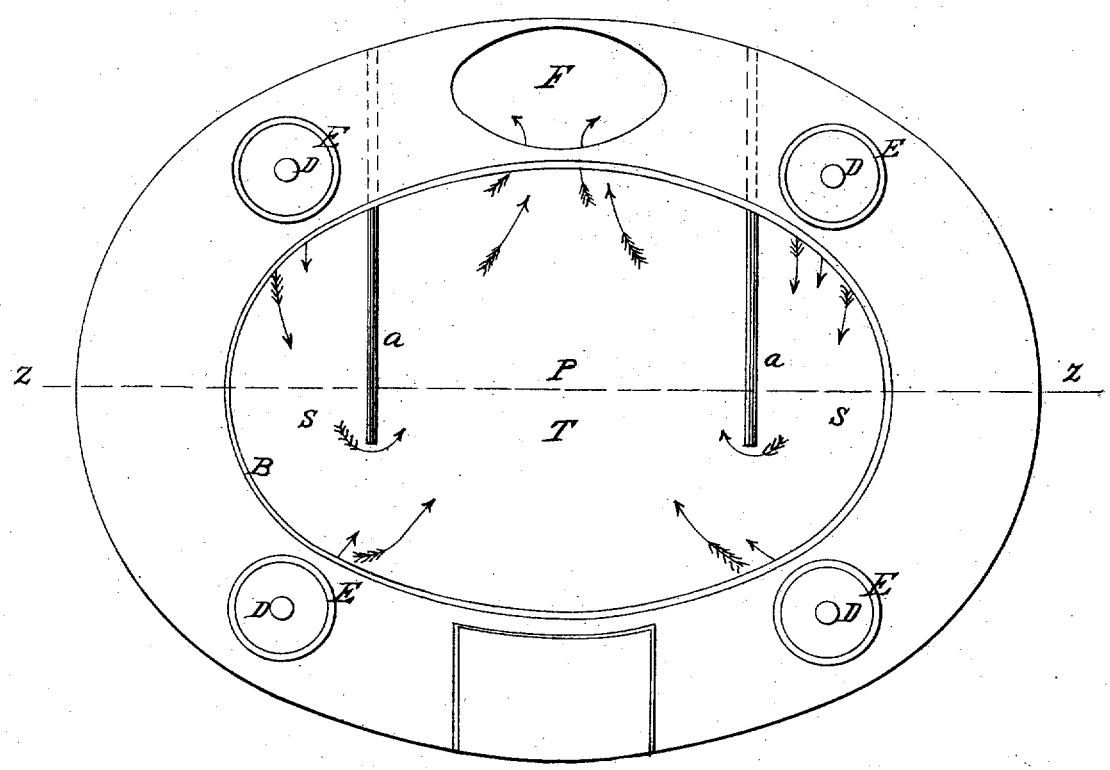

Figure 1 shows a vertical section of my stove at line *z z* in Fig. 2. Fig. 2 is a plan of the stove-bottom.

R indicates the fire and combustion chamber; Q, a temporary guard-lining around the fire, to prevent the burning and disfiguring of the outside surface from the extreme heat of the ignited fuel.

C refers to the top of the stove, which is double, leaving a space between its two parts projecting over the outside of the body B far enough to receive the pipes E E, outside of the body B, said pipes to be continued down independent of the body B to the base A, which is made double or hollow, leaving sufficient space for the flues S S and T, for the free circulation of the heated products of combustion brought down into said base through the pipes E E.

K is a cover, which, when removed, leaves the opening O to the fire-chamber R the full size of the interior of the body B. This is of great advantage, first, in being able to charge the stove with much larger chunks of wood than can be fed through the door N; second, if desired, it admits of heating water or other substances on a large scale; and, third, it admits of replacing the lining Q, when burned out, without taking the stove apart—a task attended with much trouble and expense in other stoves having similar lining.

D D are rods or bolts, which pass down through the pipes E E from the upper part of the top C to the lower part of the base A, by which all parts of the stove are bolted firmly together.

G is a damper, which may be used to close or open a communication from the combustion-chamber R to the pipe F, for the purpose of a direct draft to the smoke-pipe, which may be necessary in first building a fire.

The importance of the double top C in this connection is, that its hollow part exposes the upper end of the pipes E E to the combustion-chamber R, thereby connecting them with it, and by them the hollow base is also connected with the said chamber, and it also enables me to fasten the whole stove together without interfering with the large opening in the top C.

What I claim as my invention, and desire to secure by Letters Patent, is—

1. A heating stove having a double projecting top and an opening therein of the full or nearly full size of the interior of the stove-body, and closed by a removable cover, substantially as and for the purposes herein specified.

2. In combination therewith, a top, C, made of top and bottom plates with a heat-circulating space between them, and projecting beyond the body of the stove sufficiently to admit flues or pipes extending from the top to the base of the stove, outside of the stove body, substantially as and for the purpose herein set forth.

WM. A. BARLOW.

Witnesses:
HARVEY CHURCH,
HENRY S. CHURCH.